(12) United States Patent
Jones et al.

(10) Patent No.: US 10,259,485 B2
(45) Date of Patent: Apr. 16, 2019

(54) ADJUSTMENT LEVER DECELERATION ASSEMBLY FOR A STEERING COLUMN

(71) Applicant: STEERING SOLUTIONS IP HOLDING CORPORATION, Saginaw, MI (US)

(72) Inventors: Randy W. Jones, North Branch, MI (US); Robert W. Dubay, Saginaw, MI (US); Donald A. Buzzard, Saginaw, MI (US); Michael P. Anspaugh, Bay City, MI (US); Damian Z. Gosztyla, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 56 days.

(21) Appl. No.: 15/460,673

(22) Filed: Mar. 16, 2017

(65) Prior Publication Data

US 2017/0267273 A1 Sep. 21, 2017

Related U.S. Application Data

(60) Provisional application No. 62/309,159, filed on Mar. 16, 2016.

(51) Int. Cl.
*B62D 1/184* (2006.01)
(52) U.S. Cl.
CPC .................................. *B62D 1/184* (2013.01)
(58) Field of Classification Search
CPC ..................................................... B62D 1/184
See application file for complete search history.

(56) References Cited

U.S. PATENT DOCUMENTS

| | | | | |
|---|---|---|---|---|
| 4,041,796 | A | * | 8/1977 | Shishido ................ B62D 1/184 74/493 |
| 4,538,477 | A | | 9/1985 | Kurusu et al. |
| 4,538,478 | A | | 9/1985 | Sato et al. |
| 5,025,679 | A | | 6/1991 | Yamamoto et al. |
| 5,117,707 | A | * | 6/1992 | Kinoshita .............. B62D 1/184 280/775 |
| 5,213,004 | A | | 5/1993 | Hoblingre |
| 5,722,299 | A | * | 3/1998 | Yamamoto ............. B62D 1/184 280/775 |
| 6,276,719 | B1 | * | 8/2001 | Gartner .................. B62D 1/184 188/67 |
| 7,635,149 | B2 | | 12/2009 | Menjak |

(Continued)

FOREIGN PATENT DOCUMENTS

JP 2016147515 A * 8/2016

*Primary Examiner* — Laura Freedman
(74) *Attorney, Agent, or Firm* — Cantor Colburn LLP

(57) ABSTRACT

An adjustment lever deceleration assembly for a steering column includes an adjustment lever moveable between a locked position and an unlocked position. Also included is a clamp bolt operatively coupled to the adjustment lever. Further included is an adjustment lever decelerator operatively coupled to the clamp bolt, the adjustment lever having a base portion and at least one lobe extending from the base portion, the at least one lobe connected to the base portion by a hinge portion. Yet further included is a stationary component engageable with the at least one lobe upon rotation of the clamp bolt toward the unlocked position of the adjustment lever to decelerate the adjustment lever.

16 Claims, 4 Drawing Sheets

(56) References Cited

U.S. PATENT DOCUMENTS

| | | | | |
|---|---|---|---|---|
| 9,150,240 B2* | 10/2015 | Schnitzer | ............... | F16F 7/06 |
| 9,180,901 B2* | 11/2015 | Moriyama | ............. | B62D 1/189 |
| 9,501,082 B2* | 11/2016 | Anspaugh | ............. | B62D 1/184 |
| 9,522,693 B2* | 12/2016 | Tomaru | ............... | B62D 1/184 |
| 2002/0084644 A1 | 7/2002 | Rinker et al. | | |
| 2005/0178231 A1 | 8/2005 | Schick et al. | | |
| 2008/0060467 A1 | 3/2008 | Manwaring et al. | | |
| 2008/0202276 A1 | 8/2008 | Harris et al. | | |
| 2009/0250916 A1 | 10/2009 | Olgren | | |
| 2015/0090068 A1 | 4/2015 | Anspaugh et al. | | |
| 2016/0272234 A1* | 9/2016 | Terasawa | ............... | B62D 1/184 |
| 2017/0072987 A1* | 3/2017 | Dasadi | ............... | B62D 1/184 |
| 2018/0037249 A1* | 2/2018 | Prawda | ............... | B62D 1/184 |

\* cited by examiner

ADJUSTMENT LEVER DECELERATION ASSEMBLY FOR A STEERING COLUMN

CROSS-REFERENCE TO RELATED APPLICATION

This patent application claims priority to U.S. Provisional Patent Application Ser. No. 62/309,159, filed Mar. 16, 2016, which is incorporated herein by reference in its entirety.

BACKGROUND OF THE INVENTION

The embodiments described herein relate to steering columns and, more particularly to an adjustment lever deceleration assembly for steering columns.

Rake and/or telescope adjust steering columns commonly use either linear or rotary actuation of a lever to lock a steering column's rake and/or telescoping adjustment position. The actuation motion, in the locking direction, is typically used to generate clamp tension to maintain an adjustment position or to delash a system to meet noise, vibration and harshness (NVH) requirements. When actuating the adjustment levers, in the unlock direction, it is common for the lever to accelerate towards the unlock position if the operator does not maintain a grasp on the lever. The stored clamp energy can create a reversal torque that accelerates the lever towards the unlock lever stop. This acceleration away from the operator's initially applied unlocking load can create unwanted noise, wear and/or lever over-travel conditions.

SUMMARY OF THE INVENTION

According to one aspect of the invention, an adjustment lever deceleration assembly for a steering column includes an adjustment lever moveable between a locked position and an unlocked position. Also included is a clamp bolt operatively coupled to the adjustment lever. Further included is an adjustment lever decelerator operatively coupled to the clamp bolt, the adjustment lever decelerator having a base portion and at least one lobe extending from the base portion, the at least one lobe connected to the base portion by a hinge portion. Yet further included is a stationary component engageable with the at least one lobe upon rotation of the clamp bolt toward the unlocked position of the adjustment lever to decelerate the adjustment lever.

According to another aspect of the invention, an adjustment lever deceleration assembly for a steering column includes an adjustment lever moveable between a locked position and an unlocked position. Also included is a clamp bolt operatively coupled to the adjustment lever. Further included is a stationary component having a lobe extending therefrom, the lobe comprising a resilient material biased by a component of the clamp bolt upon rotation of the clamp bolt toward the unlocked position of the adjustment lever to decelerate the adjustment lever.

According to yet another aspect of the invention, an adjustment lever deceleration assembly for a steering column includes an adjustment lever moveable between a locked position and an unlocked position. Also included is a clamp bolt operatively coupled to the adjustment lever. Further included is a lower jacket having a pair of side brackets, each of the side brackets defining a clamp bolt aperture, the clamp bolt extending therethrough, the pair of side brackets defining an interior region therebetween, an exterior region along the clamp bolt located outwardly of the pair of side brackets. Yet further included is an adjustment lever decelerator operatively coupled to the clamp bolt, the adjustment decelerator lever having a base portion and lobe extending from the base portion, the lobe comprising a resilient material, the adjustment lever decelerator located on the clamp bolt at the exterior region. Also included is a stationary component engageable with the lobe upon rotation of the clamp bolt toward the unlocked position of the adjustment lever to decelerate the adjustment lever.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, an adjustment lever deceleration assembly for steering columns is provided, as will be appreciated from the disclosure herein.

Figure 1:
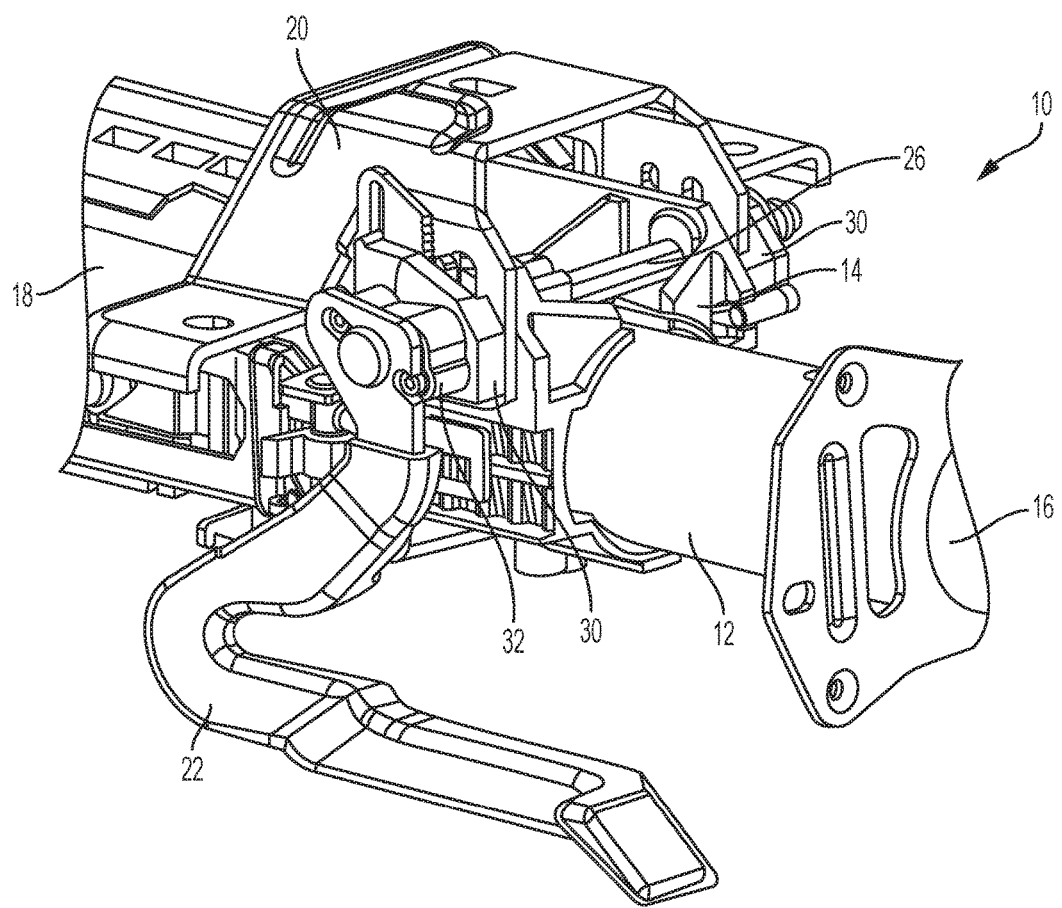
FIG. 1 is a first side perspective view of a steering column assembly with an adjustment lever decelerator.
Figure 2:
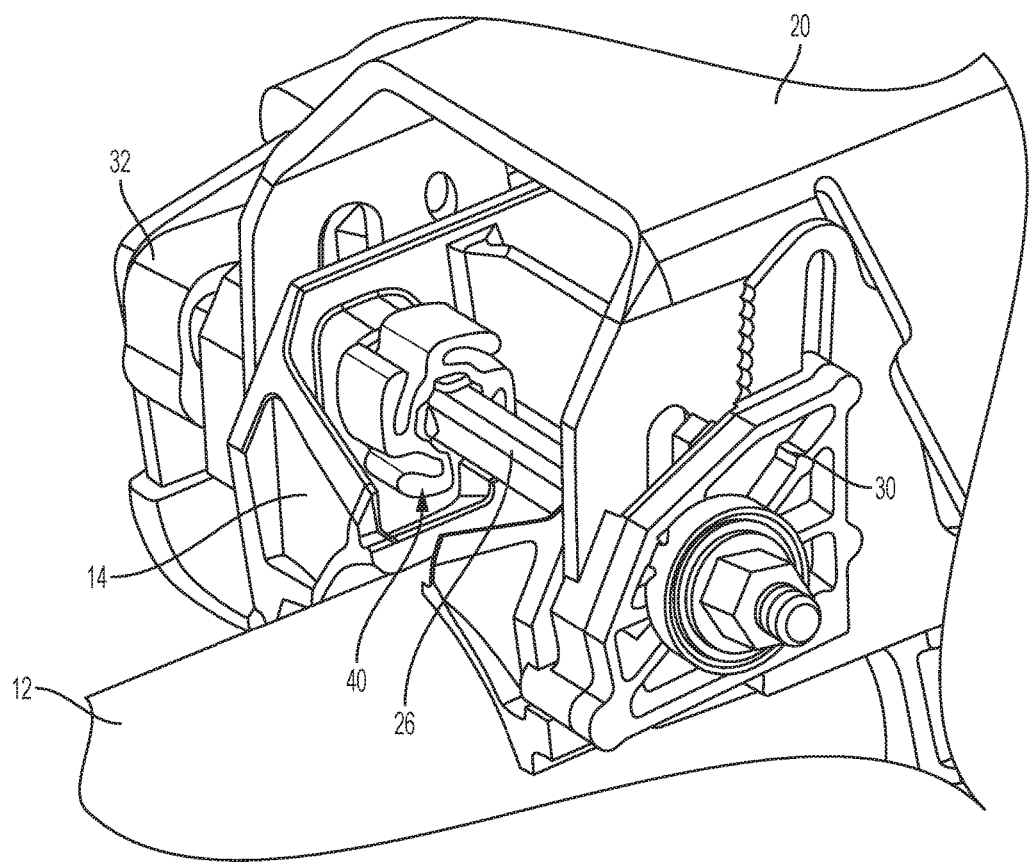
FIG. 2 is a second side perspective view of the steering column assembly.

Referring now to FIGS. 1 and 2, a portion of a steering column is illustrated and generally referenced with numeral 10. The steering column 10 includes several components, including an upper jacket 12 and a lower jacket 14 that are telescopingly engaged with each other in an axial direction (i.e., longitudinal direction of steering column). A first side 16 of the portion of the steering column 10 is closer to the driver, where a steering wheel would be positioned. A second side 18 of the portion of the steering column 10 is closer to a steering gear for controlling a position of road wheels.

The steering column 10 may be used in any type of vehicle that requires steering operation. A mounting bracket 20 is operatively coupled to the steering column to fix the steering column 10 to the vehicle and to allow adjustment or relative motion of components of the steering column 10. Adjustment is facilitated by manipulation of an adjustment lever 22 that is operatively coupled to the lower jacket 14. In particular, the adjustment lever 22 is coupled to a clamp bolt 26 that extends in a transverse direction through bracket apertures of the mounting bracket 20. Spaced outwardly of the mounting bracket 20 are one or more components on each side of the mounting bracket 20. For example, a spacer 30 may be disposed on each side of the mounting bracket 20. Additionally, a mounting element 32 may be included to provide structural stability for the adjustment lever 22. Each of the additional components disposed outwardly of the mounting bracket 20 include respective apertures configured to receive the clamp bolt 26 therethrough to align the components with the mounting bracket 20.

Actuation of the adjustment lever 22 allows a user to switch the steering column between a locked and unlocked condition. In the unlocked condition, a user is able to adjust one or more components of the steering column 10 to reposition the steering column 10 to suit the user's preference. In the locked condition, relative movement of components of the steering column 10 is inhibited. Actuation motion of the adjustment lever 22 in the locking direction generates clamp tension by the lower jacket 14 on the upper jacket 12 to maintain an adjustment position. When actuating the adjustment levers, in the unlock direction, it is common for the lever to accelerate towards the unlock position if the operator does not maintain a grasp on the lever. To avoid undesirable aspects associated with acceleration of the adjustment lever 22 when moving in the unlock direction, an adjustment lever decelerator 40 is provided.

Figure 4:
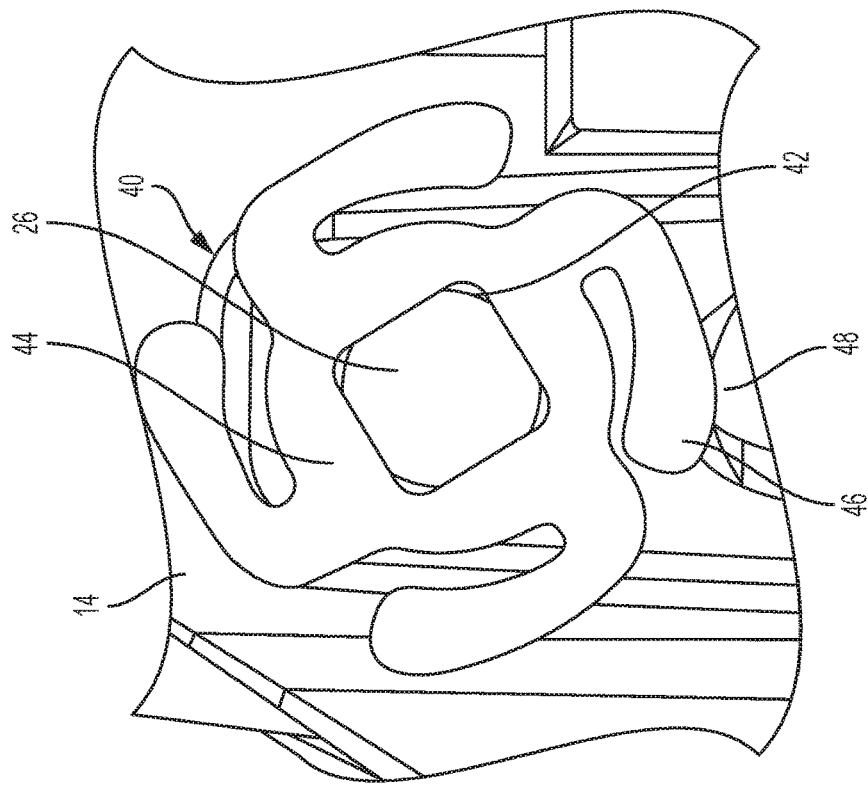
FIG. 4 is an elevational view of the adjustment lever decelerator in a second position.
Figure 3:
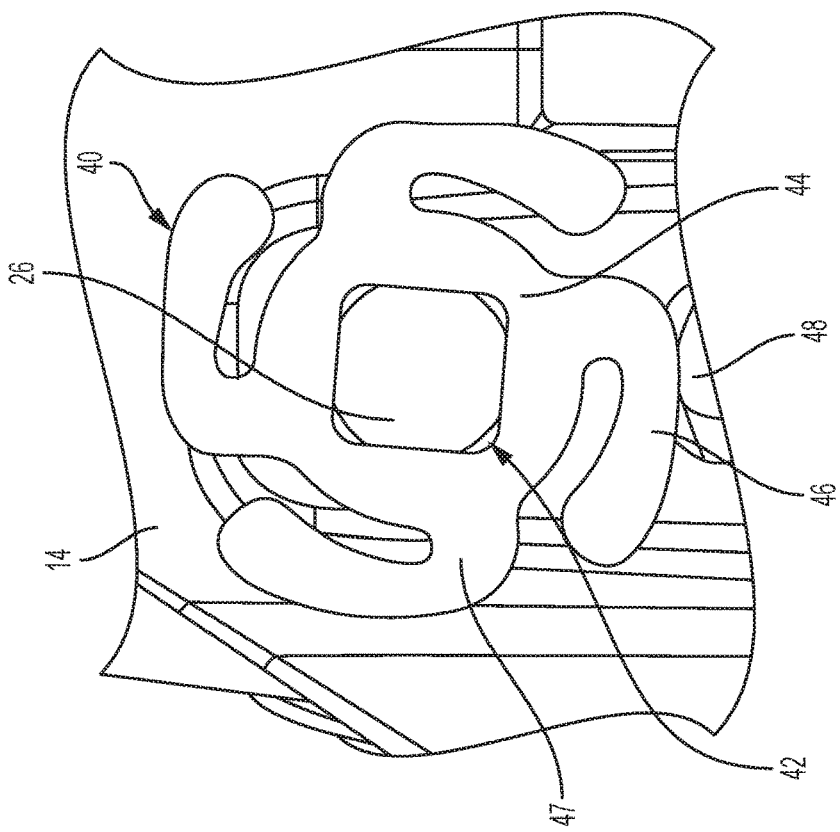
FIG. 3 is an elevational view of the adjustment lever decelerator in a first position.

Referring now to FIGS. 2-4, the adjustment lever decelerator 40 is illustrated in greater detail. The adjustment lever decelerator 40 includes a central aperture 42 that fixedly retains the adjustment lever decelerator 40 to the clamp bolt 26. As shown in FIGS. 3 and 4, the central aperture 42 may include a substantially rectilinear geometry, but it is to be appreciated that alternative geometries may be employed, including circular or triangular cross-sections, etc. In embodiments having a non-circular geometry, such as a rectilinear (which might be square or rectangular in cross-section) geometry, enhanced assembly reliability is provided, as installation of the adjustment lever decelerator 40 is prevented from occurring in an opposite direction as that which is desired.

The adjustment lever decelerator 40 includes a base portion 44 and at least one, but typically a plurality of lobes 46 extending from the base portion 44. In the illustrated embodiment, four lobes are included, but it is to be appreciated that alternative numbers of lobes may be provided in some embodiments. Irrespective of the number of the plurality of lobes 46, the lobes are formed of material that allows the lobes 46 to flex about a hinge portion 47, such as a plastic hinge portion, connecting the lobes 46 to the base portion 44 in response to the application of an applied force. To further assist with deceleration managing manufacturing tolerances, the lobe 46 includes a ramped outer surface in some embodiments. In one embodiment, the lobes are formed of a resilient material that elastically deforms as it contacts a stationary component 48. In another embodiment, only hinge portion 47 is resilient, allowing lobe(s) 46 to deflect about hinge portion 47 when contacting stationary component 48. Finally adjustment lever 40 may be comprised of a composite structure that includes a composite insert allowing hinge portion 47 to deflect while lobes 46 and/or base portion 44 are more structurally rigid.

The adjustment lever decelerator 40 is assembled onto the clamp bolt 26 in an orientation that contacts (or positions in close proximity in a locked condition) one of the lobes 46 with the stationary component 48 that does not rotate during rotation of the clamp bolt 26 in response to operation of the adjustment lever 22. In the illustrated embodiment, the stationary component 48 comprises part of the lower jacket 14, however it is to be appreciated that any component that is stationary relative to the rotational axis of the clamp bolt 26 is suitable.

In operation, as the adjustment lever 22 is actuated in the unlocking direction, the clamp bolt 26 rotates, thereby rotating the adjustment lever decelerator 40 coupled thereto. In the locked condition shown in FIG. 3, one of the lobes 46 is in light contact or slightly clear of the stationary component (e.g., lower jacket 14). Upon rotation of the clamp bolt 26 as shown in FIG. 4, the lobe 46 engages the stationary component due to a varying thickness of the adjustment lever decelerator 40 and is compressed or elastically deflects about hinge portion 47 to provide a resistance to acceleration of the adjustment lever 22. The resistance effectively decelerates the adjustment lever 22. In some embodiments, the adjustment lever decelerator 40 is rotated about 45 degrees between the locked and unlocked conditions.

In one embodiment, each of the lobes 46 is a redundant flex lobe, such that they are formed of the same dimensions with the same stiffness. In such an embodiment, the adjustment lever decelerator 40 can be assembled onto the clamp bolt 26 in any of the four positions. In another embodiment, the flex lobes each have a different stiffness. In such an embodiment, the adjustment lever decelerator 40 has a progression of fit at alternate assembled positions for performance tuning. Assembly personnel can then determine which of the lobes provides the best fit to account for manufacturing tolerances and positional variation.

Figure 5:
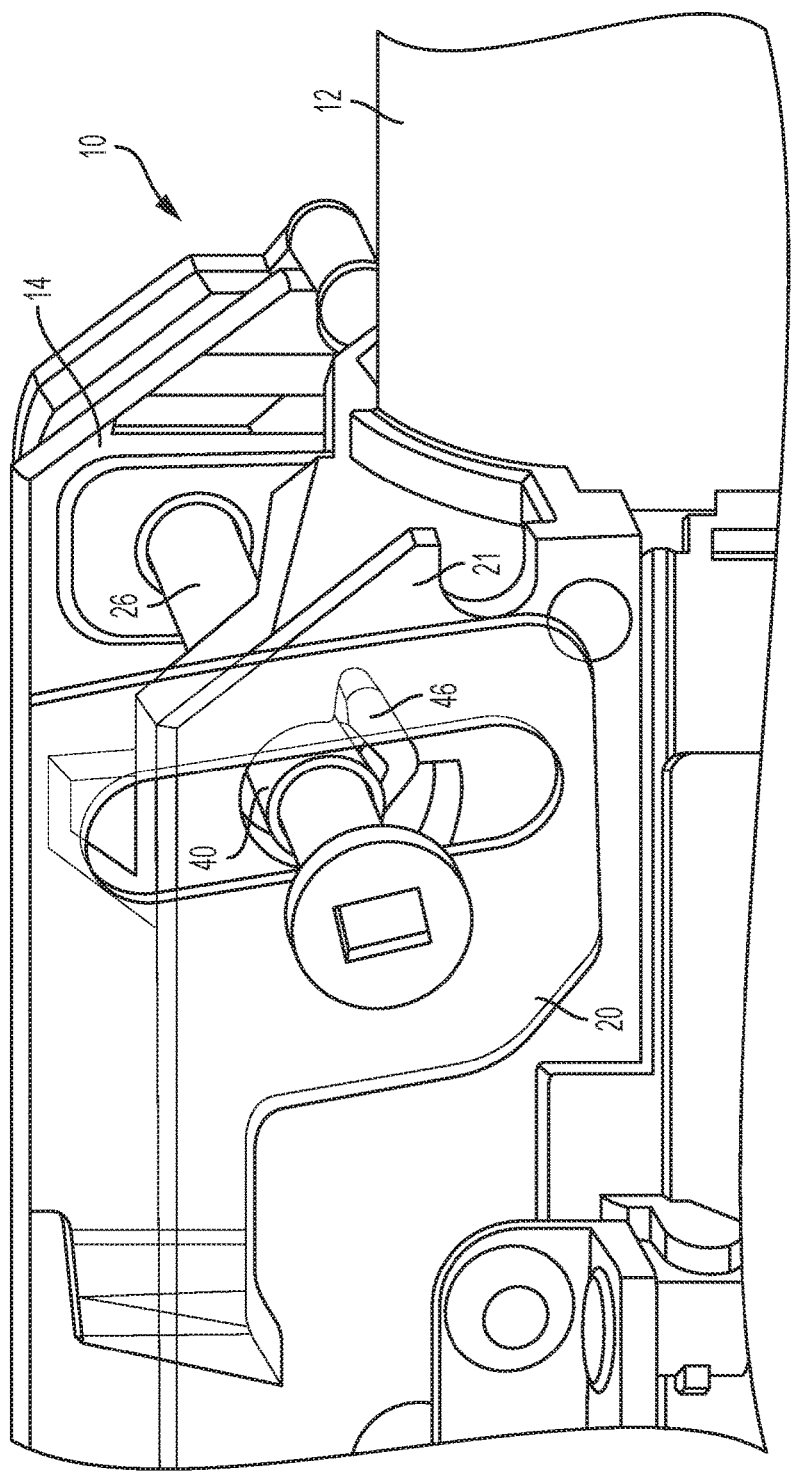
FIG. 5 is a perspective view of the steering column assembly according to another aspect of the disclosure.

Although the adjustment lever decelerator 40 is illustrated as being positioned centrally at an interior location of the mounting bracket 20 along the clamp bolt 26, it is to be understood that the adjustment lever decelerator 40 may be mounted to the clamp bolt 26 at any location therealong, including anywhere within the lower jacket 14 or outwardly thereof. For example, as shown in FIG. 5, the adjustment lever decelerator 40 is disposed outwardly of a side bracket 21 of the lower jacket 14 in some embodiments. Furthermore, the adjustment lever decelerator 40 may be disposed outwardly of the mounting bracket 20 in some embodiments. In the illustrated embodiment, the adjustment lever decelerator 40 is disposed on the side of the mounting bracket 20 that is closest to the adjustment lever 22. This positioning may assist with overall assembly by allowing the adjustment lever decelerator 40 to be pre-assembled to an adjustment lever sub-assembly and by keeping the adjustment lever subassembly components together during handling. Additionally, as described above, the adjustment lever decelerator 40 may include any number of lobes 46. In the illustrated embodiment of FIG. 5, a single lobe is provided.

The embodiments illustrated and described herein provide the adjustment lever decelerator 40 with flexing preload features (i.e., lobes 46) as being the moveable component, while engaging a stationary reactionary component. However, alternative embodiments include a flexing preload feature extending from the stationary feature (e.g., lower jacket 14) to engage a reactionary component on the rotating clamp bolt 26 or a component coupled to the clamp bolt 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment lever deceleration assembly for a steering column comprising:

an adjustment lever moveable between a locked position and an unlocked position;

a clamp bolt operatively coupled to the adjustment lever;

an adjustment lever decelerator operatively coupled to the clamp bolt, the adjustment lever decelerator having a base portion and at least one lobe extending from the base portion, the at least one lobe connected to the base portion by a hinge portion; and a stationary component engageable with the at least one lobe upon rotation of the clamp bolt toward the unlocked position of the adjustment lever to decelerate the adjustment lever.

2. The adjustment lever deceleration assembly of claim 1, wherein the adjustment lever decelerator includes a plurality of lobes.

3. The adjustment lever deceleration assembly of claim 2, wherein each of the plurality of lobes include the same dimensions and stiffness as each other.

4. The adjustment lever deceleration assembly of claim 2, wherein each of the plurality of lobes include a distinct stiffness.

5. The adjustment lever deceleration assembly of claim 1, wherein the stationary component extends from a lower jacket of the steering column.

6. The adjustment lever deceleration assembly of claim 1, wherein the clamp bolt extends through a central aperture defined by the adjustment lever decelerator.

7. The adjustment lever deceleration assembly of claim 6, wherein the central aperture is circular.

8. The adjustment lever deceleration assembly of claim 6, wherein the central aperture is non-circular.

9. The adjustment lever deceleration assembly of claim 8, wherein the central aperture is rectilinear.

10. The adjustment lever deceleration assembly of claim 1, wherein the hinge portion is a plastic hinge portion.

11. The adjustment lever deceleration assembly of claim 1, wherein the at least one lobe has a thickness that varies along a length of the lobe.

12. An adjustment lever deceleration assembly for a steering column comprising:

an adjustment lever moveable between a locked position and an unlocked position;

a clamp bolt operatively coupled to the adjustment lever; and a stationary component comprising a lobe comprising a resilient material biased by a component of the clamp bolt upon rotation of the clamp bolt toward the unlocked position of the adjustment lever to decelerate the adjustment lever, the lobe being connected to the stationary component with a hinge portion for flexure thereabout.

13. The adjustment lever deceleration assembly of claim 12, wherein the stationary component is a lower jacket of the steering column.

14. The adjustment lever deceleration assembly of claim 12, wherein the hinge portion is a plastic hinge portion.

15. The adjustment lever deceleration assembly of claim 12, wherein the lobe has a thickness that varies along a length of the lobe.

16. An adjustment lever deceleration assembly for a steering column comprising:

an adjustment lever moveable between a locked position and an unlocked position;

a clamp bolt operatively coupled to the adjustment lever;

a lower jacket having a pair of side brackets, each of the side brackets defining a clamp bolt aperture, the clamp bolt extending therethrough, the pair of side brackets defining an interior region therebetween, an exterior region along the clamp bolt located outwardly of the pair of side brackets;

an adjustment lever decelerator operatively coupled to the clamp bolt, the adjustment lever decelerator having a base portion and lobe extending from the base portion, the lobe comprising a resilient material, the adjustment lever decelerator located on the clamp bolt at the exterior region; and a stationary component engageable with the lobe upon rotation of the clamp bolt toward the unlocked position of the adjustment lever to decelerate the adjustment lever.

* * * * *